United States Patent
Park et al.

(10) Patent No.: US 10,701,550 B2
(45) Date of Patent: Jun. 30, 2020

(54) METHOD AND DEVICE FOR USING MOBILE COMMUNICATION SERVICE BY CHANGING TERMINAL IN MOBILE COMMUNICATION SYSTEM

(71) Applicant: Samsung Electronics Co., Ltd., Gyeonggi-do (KR)

(72) Inventors: Jonghan Park, Gyeonggi-do (KR); Duckey Lee, Seoul (KR); Sangsoo Lee, Gyeonggi-do (KR); Taesun Yeoum, Seoul (KR); Songyean Cho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 105 days.

(21) Appl. No.: 15/561,443

(22) PCT Filed: Mar. 25, 2016

(86) PCT No.: PCT/KR2016/003092
§ 371 (c)(1),
(2) Date: Sep. 25, 2017

(87) PCT Pub. No.: WO2016/153323
PCT Pub. Date: Sep. 29, 2016

(65) Prior Publication Data
US 2018/0124595 A1    May 3, 2018

(30) Foreign Application Priority Data
Mar. 25, 2015 (KR) .................. 10-2015-0041724

(51) Int. Cl.
*H04W 8/20* (2009.01)
*H04W 12/06* (2009.01)
*H04W 60/04* (2009.01)

(52) U.S. Cl.
CPC ............ *H04W 8/20* (2013.01); *H04W 12/06* (2013.01); *H04W 60/04* (2013.01)

(58) Field of Classification Search
CPC ........ H04W 8/20; H04W 12/06; H04W 60/04
See application file for complete search history.

(56) References Cited

U.S. PATENT DOCUMENTS 8,712,474 B2 * 4/2014 Gehrmann ........ H04W 12/0023
455/558
9,232,392 B2   1/2016 Lee et al.
(Continued)

FOREIGN PATENT DOCUMENTS

KR    1020130049748    5/2013
KR    1020140140882    12/2014

OTHER PUBLICATIONS

PCT/ISA/210 Search Report issued on PCT/KR2016/003092 (pp. 3).
PCT/ISA/237 Written Opinion issued on PCT/KR2016/003092 (pp. 7).

*Primary Examiner* — Vladimir Magloire
*Assistant Examiner* — Donald H B Braswell
(74) *Attorney, Agent, or Firm* — The Farrell Law Firm, P.C.

(57) ABSTRACT

The purpose of the present disclosure is to use a mobile communication service by changing a terminal, and a terminal changing method according to the present disclosure comprises the steps of: detecting a terminal change request for using the mobile communication service, by changing a terminal to a second terminal; receiving terminal information of the second terminal from the second terminal in response to the request; and transmitting a terminal change request message including the received terminal information of the second terminal.

15 Claims, 12 Drawing Sheets

(56) References Cited

U.S. PATENT DOCUMENTS

| | | | |
|---|---|---|---|
| 2005/0060316 A1* | 3/2005 | Kamath | G06F 17/30067 |
| 2012/0190354 A1* | 7/2012 | Merrien | H04W 4/70 |
| | | | 455/422.1 |
| 2012/0260090 A1 | 10/2012 | Hauck et al. | |
| 2012/0264400 A1 | 10/2012 | Khan et al. | |
| 2013/0072257 A1 | 3/2013 | Evans et al. | |
| 2014/0073292 A1* | 3/2014 | Kim | H04W 12/06 |
| | | | 455/411 |
| 2014/0115676 A1 | 4/2014 | Coghlan et al. | |
| 2016/0014601 A1* | 1/2016 | Mellqvist | H04W 12/06 |
| | | | 455/411 |

* cited by examiner

FIG. 3C

| # | ICCID | MCC + MNC | COMMUNICATION COMPANY NAME | TELEPHONE NUMBER | PROFILE STATE |
|---|---|---|---|---|---|
| 1 | | | Operator 1 | +49XXXX... | Enabled |
| 2 | | | Operator 2 | +49XXXX... | Disabled |
| 3 | | | Operator 3 | +82XXXX... | Disabled |

METHOD AND DEVICE FOR USING MOBILE COMMUNICATION SERVICE BY CHANGING TERMINAL IN MOBILE COMMUNICATION SYSTEM

PRIORITY

This application is a National Phase Entry of PCT International Application No. PCT/KR2016/003092 which was filed on Mar. 25, 2016, and claims priority to Korean Patent Application No. 10-2015-0041724, which was filed on Mar. 25, 2015, the content of each of which is incorporated herein by reference.

TECHNICAL FIELD

The present disclosure relates to a method and a device for installing a profile for providing a communication service in a terminal in a wireless communication system, and more specifically, to a method and an apparatus for installing a profile in a changed terminal when using a mobile communication service by changing the terminal.

BACKGROUND ART

A universal integrated circuit card (UICC) is a smart card inserted into a mobile communication terminal and enables the use of the safe mobile communication by storing personal information such as network access authentication information on a mobile communication subscriber, a telephone directory, and SMS to perform subscriber authentication and a generation of a traffic security key upon an access to mobile communication networks such as GSM, WCDMA, and LTE. The UICC includes communication applications such as a subscriber identification module (SIM), a universal SIM (USIM), and an IP multimedia SIM (ISIM) according to a kind of mobile communication networks to which a subscriber is accessed. Further, the UICC may provide a high-level security function for including various applications such as an electronic wallet, ticketing, and an electronic passport.

The conventional UICC is manufactured as a dedicated card for the corresponding mobile communication operator by the request of a specific mobile communication operator at the time of manufacturing a card, and is shipped while being preloaded with authentication information for network access of the corresponding mobile communication operator (e.g., USIM application and subscriber identification ID (IMSI), encryption key (K) value). Therefore, the corresponding mobile communication operator receives the manufactured UICC card and delivers the UICC card to a subscriber. Thereafter, if necessary, technologies of over the air (OTA) or the like may be applied to perform managements of installation, modification, deletion, or the like of applications within the UICC. A subscriber inserts the UICC card into his/her own mobile communication terminal to use a network of the corresponding mobile communication operator and application services. In addition, when replacing a terminal, a subscriber takes out the UICC card from the conventional terminal and inserts the UICC card into a new terminal, such that the new terminal may use authentication information, a mobile communication telephone number, a personal telephone directory, or the like, which are stored in the UICC card, as they are.

Meanwhile, the UICC card maintains international compatibility by defining its physical shape and logical function in a standardization organization called European Telecommunications Standards Institute (ETSI). Reviewing a form factor that defines the physical shape, a size of the form factor is getting smaller and smaller, from the most widely used Mini SIM to the Micro SIM that has been in use for several years and recently to the Nano SIM. As a result, it greatly contributes to the miniaturization of the mobile communication terminal. However, UICC cards smaller in size than the recently established Nano SIM are expected to be difficult to standardize due to the loss of users, and detachable UICC cards are expected to be difficult to further be miniaturized because a space for mounting detachable slots into the terminal is required due to its nature.

In addition, the detachable UICC cards are not suitable for a machine-to-machine (M2M) device that is required to access a mobile communication data network without a direct manipulation of a user in various installation environments such as intelligent home appliances, electricity/water meters, and a CCTV camera.

In order to solve such a problem, a method for replacing the conventional detachable UICC may be considered by embedding a security module performing functions similar to the UICC in the terminal during the manufacturing stage of the mobile communication terminal. Such a security module may be installed in the terminal during the manufacturing of the terminal, or may be installed so that it cannot be detached from some terminals. Therefore, it may be difficult to previously mount network access authentication information of a specific mobile communication operator such as IMSI, K of the USIM during the manufacturing the terminal unless it is manufactured as a terminal dedicated to a specific mobile communication operator, and the authentication information may be set only after joining a specific mobile communication operator.

Unlike the conventional UICC card which was manufactured and distributed only for a specific mobile communication operator, as a user who purchased a terminal performs a subscription to a specific mobile communication operator and a cancellation of his/her subscription to the specific mobile communication operator, a change of his/her subscription to another mobile communication operator, or the like on the UICC in addition to an eUICC which is a security module in which a newly introduced terminal is embedded, authentication information of various mobile communication operators has to be able to be safely and flexibly installed and managed.

DISCLOSURE OF INVENTION

Technical Problem

An object of the present disclosure is directed to provision of a method and an apparatus for remotely and flexibly installing a profile in a corresponding mobile communication operator to join a subscriber in a wireless communication service in a manner such that profile information including a subscriber identifier and an encryption key (K) is remotely installed in a terminal equipped with a UICC (including an eUICC and a detachable UICC) in a wireless communication network using methods such as wireless communication.

Another object of the present disclosure is directed to provision of a method and an apparatus for installing and managing a profile in a new terminal when a user changes a terminal.

Objects of the present disclosure are not limited to the above-mentioned objects. That is, other objects that are not mentioned may be obviously understood by those skilled in the art to which the present disclosure pertains from the following description.

Solution to Problem

Various embodiments of the present disclosure are directed to the provision of a method of a first terminal in a mobile communication system, including: detecting a terminal change request for using the mobile communication service, by changing a terminal to a second terminal; receiving terminal information of the second terminal from the second terminal in response to the request; and transmitting a terminal change request message including the received terminal information of the second terminal.

Various embodiments of the present disclosure are directed to the provision of a method of a mobile network operation business support system (MNO BSS) in a mobile communication system, including: receiving a terminal change request for using the mobile communication service, by changing a terminal from a first terminal to a second terminal; determining whether the mobile communication service has been used by changing the terminal to the second terminal; mapping a profile of the second terminal to a subscription linked to a profile of the first terminal if it is determined as the determination result that the mobile communication service has been never used by changing the terminal to the second terminal; and transmitting a profile download message for transmitting a profile of the second terminal.

Various embodiments of the present disclosure are directed to the provision of a method of a first terminal in a mobile communication system, including: receiving a terminal change request from a second terminal for using the mobile communication service, by changing a terminal to a first terminal; transmitting terminal information of the first terminal to the second terminal in response to the request; receiving an event notification message including event information indicating a profile download from a discovery center (DC) to download a profile for the terminal change; and downloading the profile based on the event information.

Various embodiments of the present disclosure are directed to the provision of a first terminal in a mobile communication system, including: a transceiver configured to transmit/receive a signal to and from other network entities; and a controller configured to detect a terminal change request for using the mobile communication service by changing a terminal to a second terminal, receive terminal information of the second terminal from the second terminal in response to the request, and transmit a terminal change request message including the received terminal information of the second terminal.

Various embodiments of the present disclosure are directed to the provision of a first terminal in a mobile communication system, including: a transceiver configured to transmit/receive a signal to and from other network entities; and a controller configured to receive a terminal change request from a second terminal for using the mobile communication service, by changing a terminal to a first terminal, transmit terminal information of the first terminal to the second terminal in response to the request, receive an event notification message including event information indicating a profile download from a discovery center (DC) to download a profile for the terminal change; and download the profile based on the event information.

Various embodiments of the present disclosure are directed to the provision of a mobile network operator business support system (MNO BSS) in a mobile communication system, including: a transceiver configured to transmit/receive a signal to and from other network entities; and a controller configured to receive a terminal change request for using the mobile communication service by changing a terminal from a first terminal to a second terminal, determine whether the mobile communication service has been used by changing the terminal to the second terminal, map a profile of the second terminal to a subscription linked to a profile of the first terminal if it is determined as the determination result that the mobile communication service has been never used by changing the terminal to the second terminal; and transmit a profile download message for transmitting a profile of the second terminal.

Advantageous Effects of Invention

According to the embodiment of the present disclosure, it is possible to efficiently perform the opening of the eUICC terminal and flexibly operate the profile management server for the downloading of the profile. In addition, it is possible to flexibly install and manage the remote installation of the profile of the mobile communication operator in the eUICC terminal. In particular, according to the present disclosure, it is possible to change the terminal while maintaining the subscription of the communication service.

BRIEF DESCRIPTION OF DRAWINGS

FIG. 3C is a diagram illustrating an example of a profile list.

MODE FOR THE INVENTION

Figure 1:
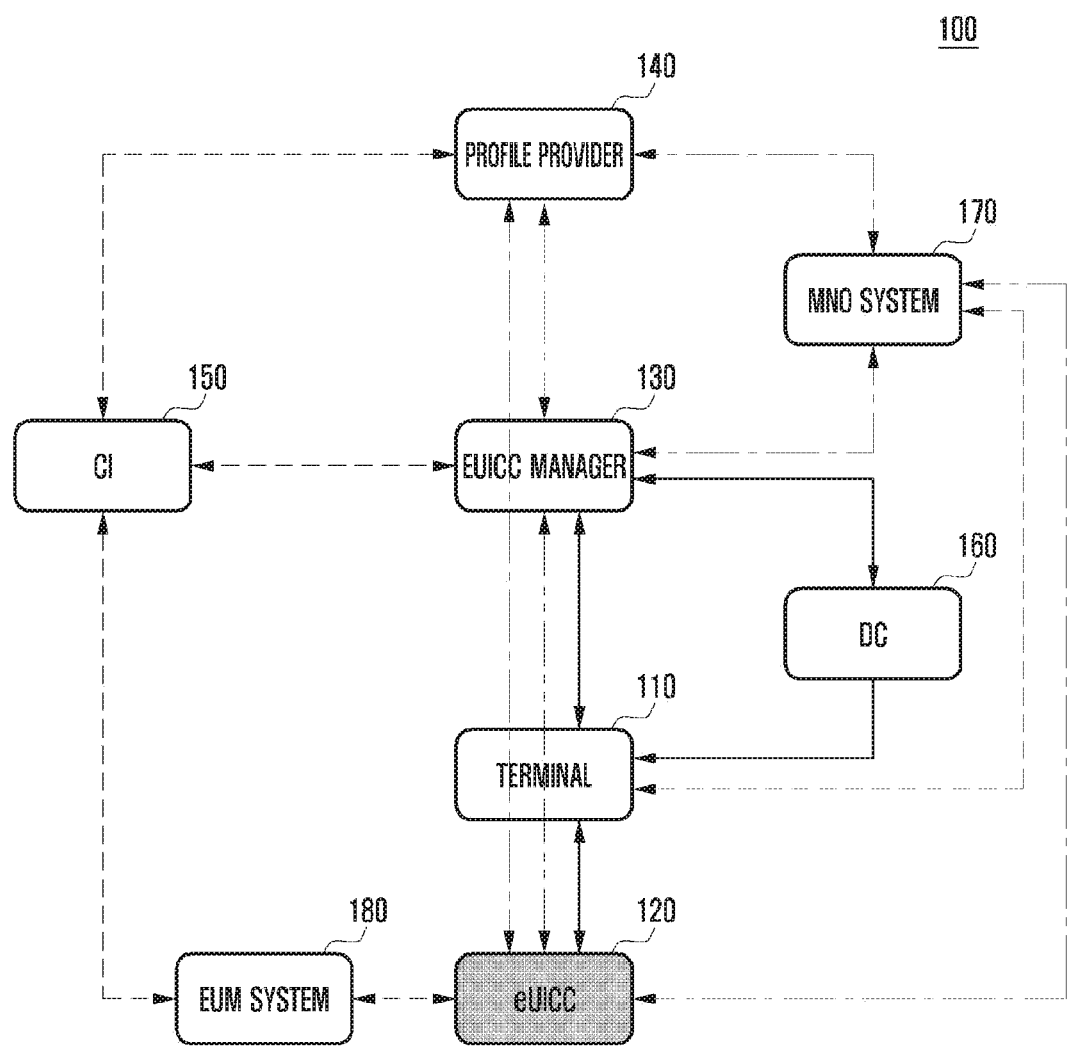
FIG. 1 is a diagram illustrating a configuration example of a wireless communication system for remotely transmitting/receiving a profile for providing a communication service according to an embodiment of the present disclosure.

Hereinafter, embodiments of the present disclosure will be described in detail with reference to the accompanying drawings.

In describing the embodiments of the present disclosure, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s). Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '-unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

Hereinafter, if it is determined that the detailed description of the known art related to the present disclosure may obscure the gist of the present disclosure, the detailed description thereof will be omitted. Hereinafter, embodiments of the present disclosure will be described in detail with reference to the accompanying drawings.

Above all, terms used in the present specification will be defined. The terms used in the embodiments of the present specification may be defined according to terms used in the ordinary artisan, but in the case of matters relating to the embodiments of the present specification, the operations or characteristics thereof may be described according to terms used in the present specification.

In addition, in the present specification, a UICC is similar to an embedded UICC (eUICC) that may download and install a profile in function, but it may physically include one which is detachably mounted on the terminal or embedded in the terminal. In the present specification, the UICC is a smart card inserted into a mobile communication terminal and may mean a chip which enables the use of the safe mobile communication by storing personal information such as network access authentication information on a mobile communication subscriber, a telephone directory, and SMS to perform subscriber authentication and a generation of a traffic security key upon an access to mobile communication networks such as GSM, WCDMA, and LTE. The UICC includes communication applications such as a subscriber identification module (SIM), a universal SIM (USIM), and an IP multimedia SIM (ISIM) according to a kind of mobile communication networks to which a subscriber is accessed. Further, the UICC may provide a high-level security function for including various applications such as an electronic wallet, ticketing, and an electronic passport.

In the present specification, the eUICC is assumed to be a chip type security module that is embedded in the terminal and thus cannot be detachable. However, the embodiments of the present disclosure may be equally applied as long as even the UICC which is manufactured in the conventional UICC form so as to be detachable and has the same functions and electrical and software characteristics as the eUICC may be just detached and does not have the functional difference. Also, the embodiments of the present disclosure may be applied even to the operation of the eUICC manufactured in the form of the UICC. The eUICC may download and install a profile using a general IP network such as a wireless communication network or WiFi. The embodiment of the present disclosure may be applied regardless of a type of networks which downloads the profile.

In the present specification, the profile may mean that at least one of applications, a file system, an authentication key value which are stored in the UICC is packaged in a software form.

In the present specification, a USIM profile may be the same meaning as the profile or may mean that information included in a USIM application within the profile is packaged in the software form.

In the present specification, a profile provider may be expressed as a subscription manager data preparation (SM-DP), a profile providing server, an off-card entity of a profile domain, a profile encryption server, a profile generation service, a profile provisioner, or the like.

In the present specification, the eUICC manager may be expressed as a subscription manager secure routing (SM-SR) profile management server, an off-card entity of an eUICC profile manager, and a profile manager.

In the present specification, a discovery center (DC) may be expressed as a discovery & push function (DPF), an address resolution server (ARS), a discovery server, a discovery function, an event delivery function, or the like.

The term 'terminal' used in the present specification may be named a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or other terms. Various exemplary embodiments of the terminal may not only include a cellular phone, a smart phone having a wireless communication function, a personal digital assistant (PDA) having a wireless communication function, a wireless modem, a portable computer having the wireless communication function, a photographing apparatus such as a digital camera having the wireless communication function, a gaming apparatus having the wireless communication function, home appliances for storing and playing music having the wireless communication function, and internet home appliances which enables wireless internet access and browsing, but also include portable units or terminals in which combinations of the functions are integrated. Further, the terminal may include even a meter including a communication function.

Further, in the present specification, the terminal may include a machine to machine (M2M) terminal and a machine type communication (MTC) terminal/device, but is not limited thereto.

In the present specification, a profile discriminator may be named a profile identifier (profile ID), an integrated circuit card ID (ICCID), and a factor matched with an ISD-P or a profile domain (PD). A profile ID may represent unique identifiers of each profile. In the present specification, an eUICC identifier may be a unique identifier of the eUICC embedded in the terminal and may be named an eUICC ID (EID). In addition, the profile identifier may be used to identify a profile on the network.

Hereinafter, for the convenience of description, the UICC which downloads and installs the profile will be described as the eUICC.

FIG. 1 is a diagram illustrating a configuration example of a wireless communication system for remotely transmitting/receiving a profile for providing a communication service according to an embodiment of the present disclosure.

Referring to FIG. 1, a wireless communication system 100 may include at least one of a terminal 110, an eUICC 120, an eUICC manager 130, a profile provider 140, a certificate issuer 150 (hereinafter, referred to as CI), a discovery center 160 (hereinafter, referred to as DC), a mobile network operator 170 (hereinafter, referred to as MNO) system, and an eUICC manufacturer system (EUM) 180. A CI may also be named certificate authority (CA).

The terminal 110 for accessing the wireless communication network in the wireless communication system 100 according to the embodiment of the present disclosure may transmit/receive a signal to/from the eUICC 120 to install profiles, select the installed profiles, delete the installed profiles, or initialize setting and profiles of the eUICC 120.

The eUICC 120 may transmit/receive a signal to and from the terminal 110 to install the profiles, select the profiles, delete the profiles, or initialize settings and profiles of the eUICC 120.

In addition, the eUICC 120 may store a CI public key or a CI certificate and store a certificate and a private key of the eUICC 120, and may use them to authenticate the profile provider 140 having a certificate and a private key issued from the same CI and its Sub CI.

In addition, the eUICC 120 may authenticate the eUICC manager 130 having the certificate and the private key issued from the CI corresponding to the held CI public key and its Sub SI.

Also, the eUICC 120 may store a plurality of CI public keys or CI certificates and use them for authentication.

The eUICC manager 130 may transmit/receive a signal to and from the DC 160 and transmit information required to start the profile download.

In addition, the eUICC manager 130 may perform authority verification based on the certificate in managing the eUICC. At this time, the eUICC manager certificate may represent a business entity such as the MNO system 170 and a terminal manufacturer, and the eUICC 120 may verify an eUICC management operation performed by the eUICC manager 130 based on the eUICC manager certificate.

In addition, the eUICC manager 130 may perform profile management. For example, profile management such as downloading profiles, enabling and disabling profiles, and deleting profiles may be performed.

The profile provider 140 generates a profile package and performs encryption.

The DC 160 may help find the eUICC manager 160 to which the eUICC 120 needs to connect in order to process a waiting eUICC management event and transmit an eUICC management event to the eUICC in a push manner in an internet protocol network.

In addition, the terminal 110 may transmit/receive a signal to and from the DC 160 and transmit/receive the information required to start the profile download.

The profile may include a subscriber identifier (e.g., international mobile subscriber identity (IMSI)) of the terminal and an encryption key (for example, K) for authentication. In addition, the profile may include various information for communication services provided by the corresponding mobile communication operator.

Figure 2:
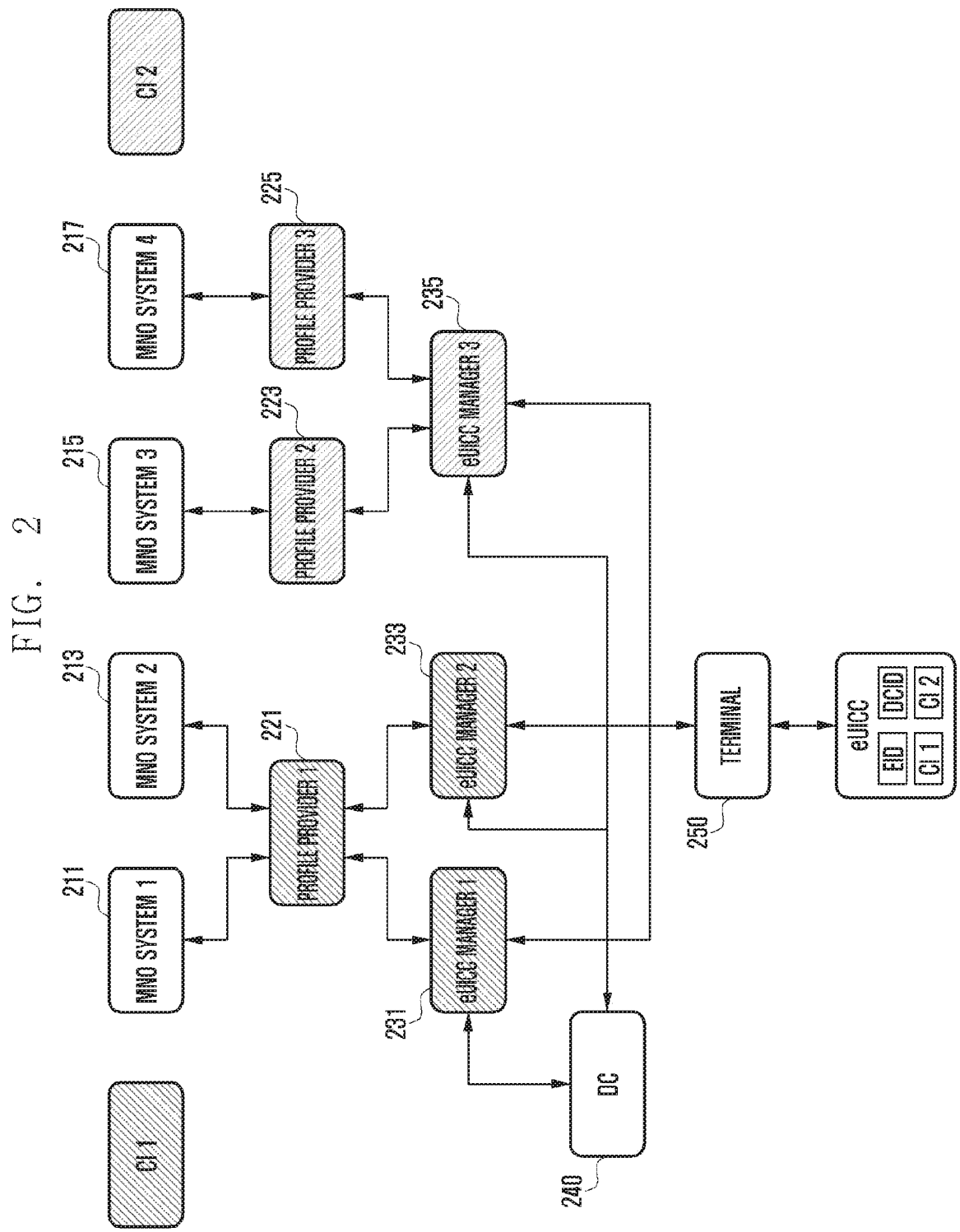
FIG. 2 is a diagram illustrating a configuration example of a part of a wireless communication system according to an embodiment of the present disclosure.

FIG. 2 is a diagram illustrating a configuration example of a part of a wireless communication system according to an embodiment of the present disclosure.

Referring to FIG. 2, a plurality of MNO systems may individually interwork with the profile provider. For example, profile providers 223 and 225 may each interwork with an MNO business support system (BSS) of MNO systems 215 and 217, and one profile provider 221 may be associated with the MNO BSS of the plurality of MNO systems 211 and 213.

In addition, the eUICC manager may interwork with the profile provider. For example, one eUICC manager 235 may interwork with the plurality of profile providers 223 and 225, and a plurality of eUICC managers 231 and 233 may interwork with one profile provider 221.

Also, one terminal 250 may interwork with one or a plurality of eUICC managers 231, 233, and 235. At this time, the eUICC stores a plurality of CI certificates or CI public keys, and thus may authenticate the eUICC manager or the profile provider directly issued from the corresponding CI (for example, CI 1, CI 2) or through the Sub-CI.

The eUICC 260 may store identification information of the eUICC, for example, an EID 263. In addition, the eUICC 260 may store identification information of a predetermined DC (e.g., 240), e.g., a DCID 265, for the downloading of the profile.

In addition, the DC 240 may interwork one or the plurality of eUICC managers 231, 233, and 235 to provide a function of selecting the eUICC managers required for the terminal. At this time, a method of selecting an eUICC manager may be a method (push) of storing necessary information in a DC and directly notifying the terminal of the information or a method (pull) of reading information stored in the DC from the terminal.

Figure 3A:
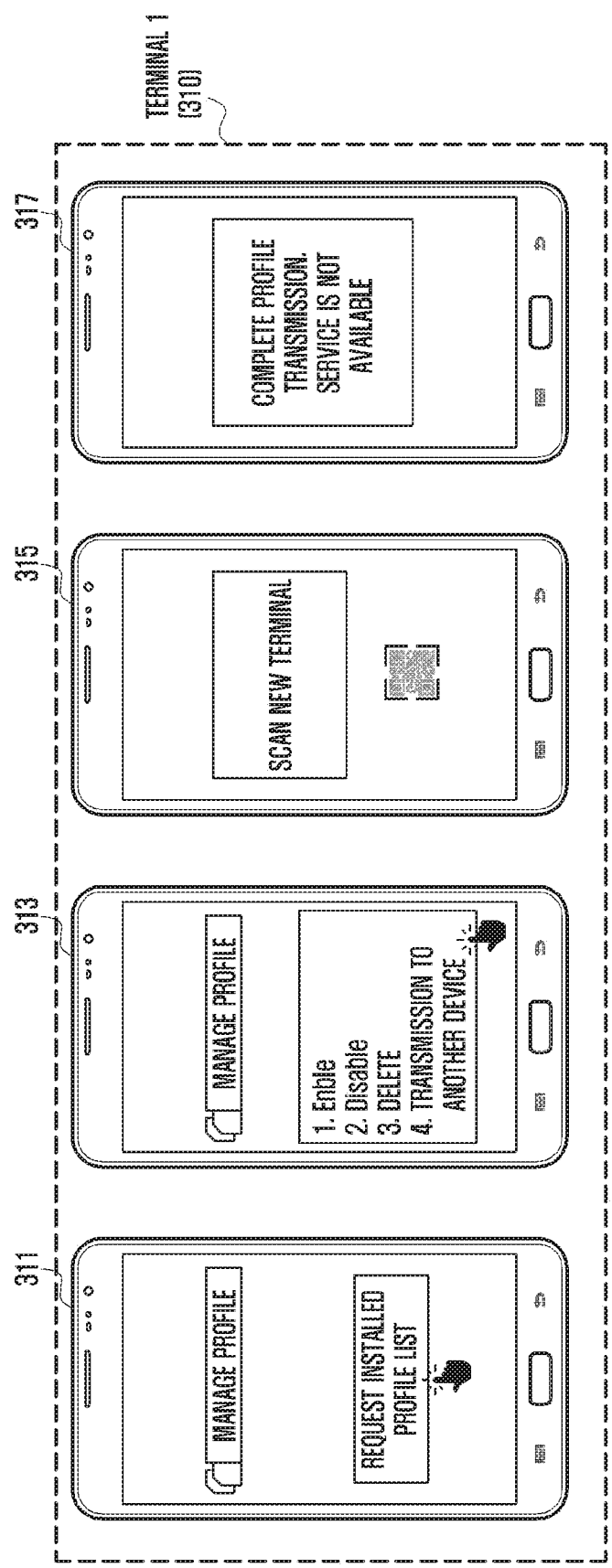
FIGS. 3A and 3B are diagrams illustrating a terminal screen configuration and sequence in a terminal change scenario according to an embodiment of the present disclosure.
Figure 3B:
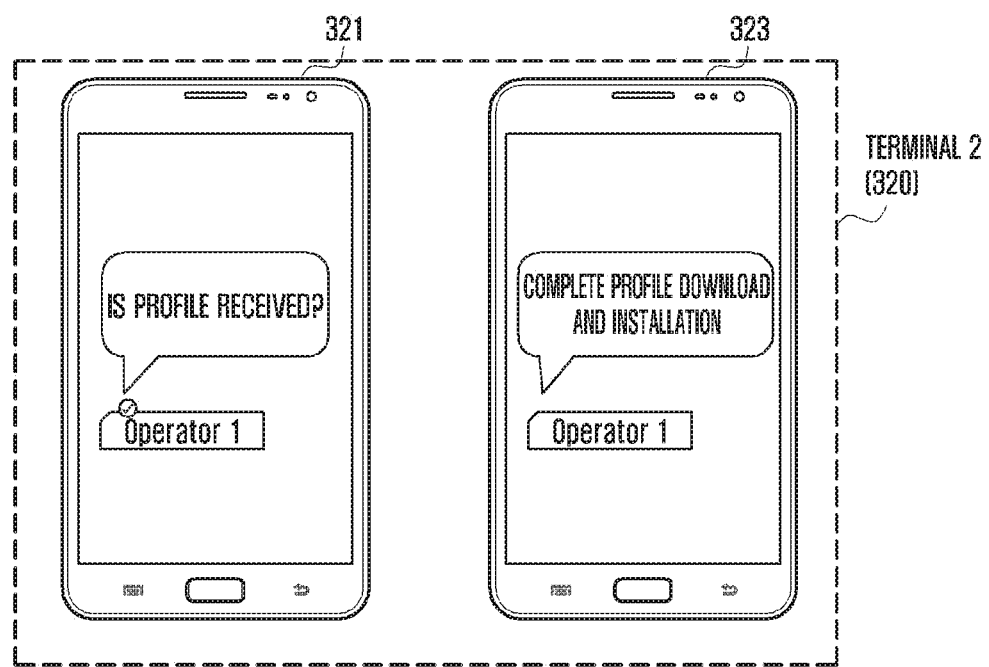

FIGS. 3A and 3B are diagrams illustrating a terminal screen configuration and sequence in a terminal change scenario according to an embodiment of the present disclosure.

Referring to FIGS. 3A and 3B, a terminal change scenario in the present disclosure means a scenario using a mobile communication service by changing a terminal from a terminal (hereinafter, terminal 1 310) which is currently being used by a user to a new terminal (hereinafter referred to as terminal 2 320). Specifically, in order for a user to use the terminal 2, the terminal 2 needs to download a profile newly mapped to a subscription linked to the profile of the terminal 1, in which the process is referred to as a terminal change process.

First, the terminal can manage the profile installed in the eUICC through a terminal application or a setting screen.

The terminal may receive an installed profile list request input like a screen 311. If the user clicks the installed profile list request on the screen 311, the terminal 1 may show the user the profile list installed in the terminal 1 through the screen of the terminal 1. The profile list is described in detail in FIG. 3C.

FIG. 3C is a diagram illustrating an example of a profile list.

Referring to FIG. 3C, the installed profile list may include an ICCID value, an MCC+MNC value, a communication company name, a telephone number, and a profile state of a profile included in the profile list. The state of the profile may be indicated as enable or disable.

In addition, the profile list may include a part of the ICCID value of the profile, the mobile country code (MCC)+mobile network code (MNC) value, the communication company name, a telephone number, and the profile state of the profile listed in the profile list. For example, the profile list may include only the communication company name of the profile, the telephone number, and the state of the profile.

The ICCID may mean unique identifiers of each profile for identifying the profiles.

The MCC means unique values allocated to each country, and the MNC may mean unique values for each business. In addition, the communication company name may mean the name of the business operator and may be expressed as Deutche telecom, KT, SKT, LGU, and the like. The communication company name may be used for the user to easily distinguish the business operator.

The user may select any one of the profiles included in the profile list, change the selected profiles to the enable or disable state, and delete the selected profiles or transmit the selected profile to other devices.

Returning to FIG. 3A, if the terminal 1 receives an input for selecting (for example, selecting #1 in FIG. 3B) a specific profile among the profiles included in the profile list, the terminal 1 may display a profile management menu like the screen 313. The profile management menu may include a profile enable, a profile disable, a profile deletion, and a menu for transmitting a profile to other devices.

The terminal may receive an input for selecting one of the profile management menus. If the terminal receives the input for transmitting a profile to other devices, the terminal 1 guides the terminal to scan information of a new terminal like a screen 315 on the screen of the terminal. At this time, the camera of the terminal 1 is activated and may prepare to scan a QR code or a barcode including the information of the terminal 2. The terminal 1 may acquire the information of the terminal 2 by scanning the QR code or the barcode which is printed on a box of the terminal 2 or viewed through the setting screen of the terminal 2.

The terminal 1 that has acquired the information of the terminal 2 may request the eUICC manager or the MNO BSS to change the terminal. According to the terminal change request, the profile of the terminal 2 may be mapped to a subscription (hereinafter, contract) corresponding to the profile of the terminal 1, and the profile of the terminal 2 may be downloaded to and installed in the terminal 2. By downloading and installing the profile of the terminal 2 to and in the terminal 2, the user may use the communication service used in the terminal 1 even in the terminal 2.

If the transmission of the profile is completed, it is possible to indicate that the transmission of the profile is completed like a screen 317.

In addition, if the terminal 1 requests the change of the terminal to complete the change of the terminal, the user may not receive the service using the terminal 1, and the terminal 1 displays that the service may not be received like the screen 317. Also, the terminal 1 may store the state of the profile of the terminal 1 in a deactivate state instead of the enable or disable. A profile that is in the deactivate state may not be enabled by the terminal or the eUICC itself.

However, if there is another available profile among the profiles included in the profile list of the terminal 1, the terminal 1 may receive the service by selecting and enabling the available profile.

Meanwhile, the terminal 2 320 may select whether to receive the profile through the screen.

The terminal 2 may display on the screen a question to confirm whether or not the profile is received like a screen 321. The user may select whether or not to receive the profile according to the content displayed on the terminal 2.

Upon receiving the selection for receiving the profile, the terminal may complete the download and installation of the profile like the screen 323, and if the download and installation of the profile to and in the terminal 2 is completed, the completion may be displayed on the screen of the terminal 2.

Figure 4:
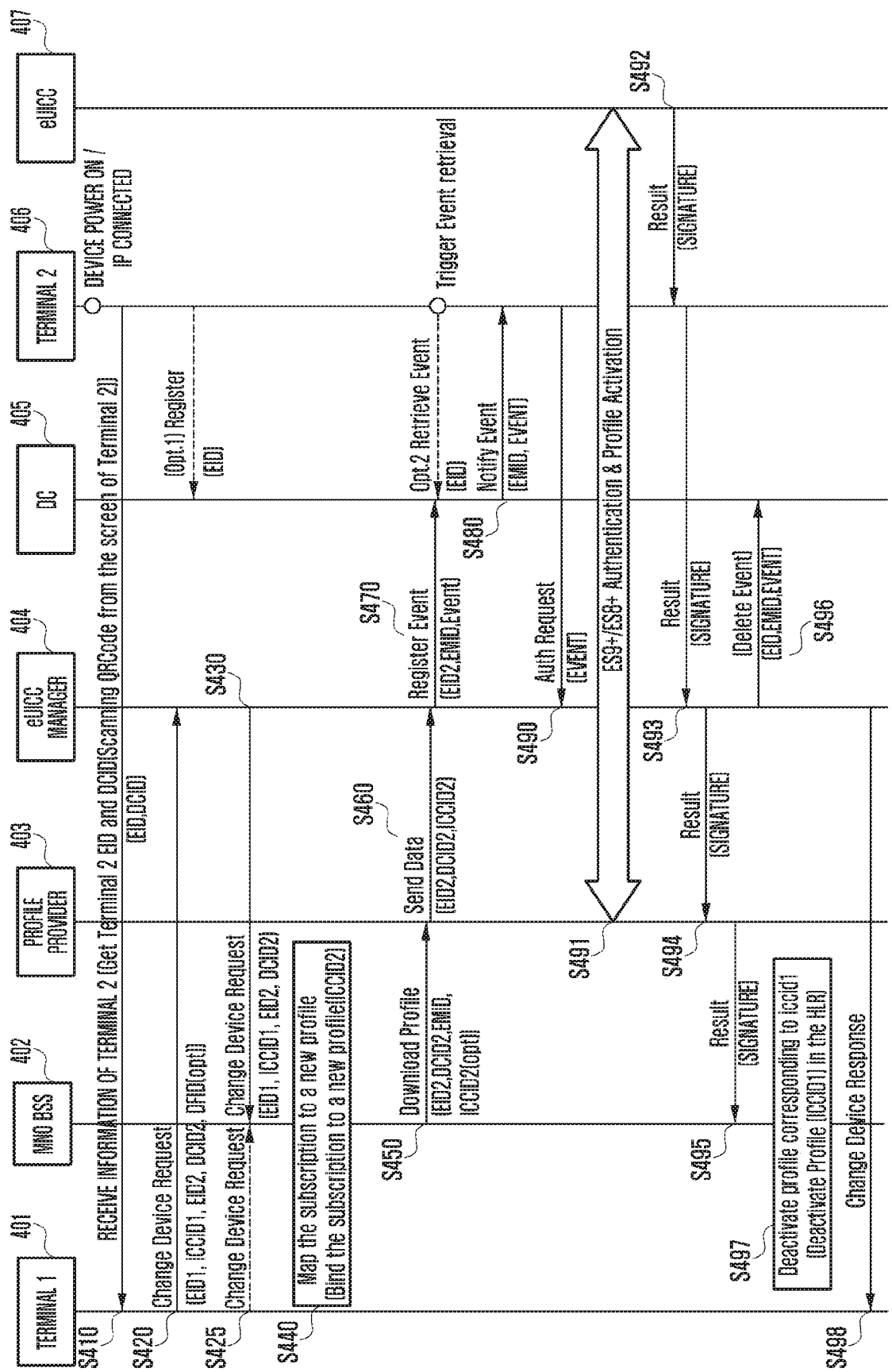
FIG. 4 is a diagram illustrating an operation of a wireless communication system in the terminal change scenario according to an embodiment of the present disclosure.

FIG. 4 is a diagram illustrating an operation of a wireless communication system in the terminal change scenario according to an embodiment of the present disclosure.

Referring to FIG. 4, in step S410, the terminal 1 401 may receive information of the terminal 2 406. The information of the terminal 2 406 may include EID 2 and DCID 2 of the terminal 2 406. The terminal 1 401 may scan the QR code through the screen of the terminal 2 406 and scan the EID and the DCID in order for the terminal 1 401 to receive the information of the terminal 2 406.

The method for receiving, by a terminal 1 401, information of a terminal 2 406 may be one or more of the following methods.

Method of inputting an EID and a DCID of a terminal 2 406 to a camera of a terminal 1 401 using a barcode or a QR code.

Method of manually inputting an EID and a DCID of a terminal 2 406 to an input unit of a first terminal 401

Method for receiving an EDI and a DCID from application of a terminal 2 406, If the terminal 1 401 and the terminal 2 406 are connected to each other by Bluetooth, WiFi, near field communication (NFC) or the like.

Method of directly reading an EID and a DCID from an eUICC included in a terminal 2 406 from a terminal 1 401 after the terminal 1 401 and the terminal 2 406 are connected to each other by the Bluetooth SIM access profile.

The terminal 1 401 receiving the information of the second terminal 406 may transmit the terminal change request message (change device request message) to the eUICC manager 404 in step S420. The terminal change request message (change device request message) may include EID1 and ICCID1, which are the information of the terminal 1 and one or more value of EID2, DCID2, and DPID which are information of the terminal 2 received.

The EID1 is the EID of the eUICC connected to the terminal 1, the ICCID1 is the identifier (ICCID) of the profile installed in the terminal 1, the EID2 is the EID scanned by the terminal 2, and the DCID2 is the identifier (DCID) of the DC scanned by the terminal 2. In addition, the terminal change request message may include the identifier (DPID) of the profile provider 403 capable of processing the ICCID1.

In step S430, the eUICC manager 404 may transmit the terminal change request messages (change device request messages) by including a part or all of the terminal change request in the MNO BSS.

However, the terminal 1 may directly transmit the terminal change request message to the MNO BSS 402 as in step S445.

In step S440, the MNO BSS having received the terminal change request message may check whether the EID2 is mapped to the subscription linked to the ICCID1. If the EID2 is not mapped, the EID2 may be managed by mapping the ICCID2 to the subscription linked to the ICCID1.

Hereinafter, the MNO BSS 402 may perform the download and installation of the profile corresponding to the ICCID2 to the eUICC corresponding to the EID2 via the profile provider 403.

Specifically, the MNO BSS 402 may transmit a profile download message (DownloadProfile message) to the profile provider in step S450. The profile download message (DownloadProfile message) may include the EID2, the DCID2, and the ICCID2. Also, the profile download message (DownloadProfile message) may include an eUICC manager identifier (EMID).

In step S460, the profile provider 403 may correspond to the received EMID by using the EID2, the DCID2, and the ICCID2 included in the profile download message (DownloadProfile message) or transmit a data transmission message (SendData) to a predetermined eUICC manager 404. The data transmission message may include the EID2, the DCID2, and the ICCID2.

In step S470, the eUICC manager may confirm the DCID2 included in the data transmission message (SendData message) and transmit an event registration message to the DC 405 corresponding to the DCID2. The event registration event (Register Event) message may include the EMID, the EID2, and the event information.

The event information may be information including an event identifier and an event type.

The event type serves to distinguish events such as a policy rule download and a profile download.

Hereinafter, in step S480, the DC may transmit an event notification (Notify Event) message including the EMID and the event information to the terminal. The method for transmitting, by the DC, the event notification message to the terminal by the DC may include one of the following methods or both methods.

The DC 405 may receive and register the EID through the registration message (Register) from the terminal 2 406 after terminal 2 406 power on and IP connection (device power on/IP connected) (Opt. 1) and transmit the event notification message to the terminal 2 (406).

In addition, if receiving an event retrieval message (retrieve event) including the EID requesting the event notification from the terminal 406 by generating the event retrieval request (trigger event retrieve), the DC 405 may transmit the event notification message (Notify event) to the terminal.

In step S490, the terminal 2 406 may request authentication to the eUICC manager 404 corresponding to the EMID included in the event notification message and in step S491, interwork with the eUICC manager to download and install the profile if the authentication is completed.

For example, the eUICC manager 404 can perform mutual authentication with the eUICC 407, and if the mutual authentication succeeds, the profile provider 403 may perform mutual authentication with the eUICC 407. At this time, the profile provider 403 may encrypt the profile using the generated key and transmit the encrypted profile to the eUICC manager 404.

The eUICC manager 404 may add additional information for integrity protection to the encrypted profile information and transmit it to the terminal 406. The terminal 406 divides the received information and transmits the divided information to the eUICC 407 to perform the download and installation of the profile.

Hereinafter, in step 492, the eUICC 407 may transmit a result message (result) including a signature of the eUICC to the terminal 2 406 and in step S493, the terminal 2 may transmit the result message to the eUICC manager. In addition, in steps S494 and S495, the eUICC manager may transmit the result message (result) to the MNO-BSS through the profile provider or directly transmit the result message to the MNO-BSS.

Meanwhile, if the event has been processed, in step S496, the eUICC manager 404 may transmit an event delete message (delete event) to the DC 405 and the DC 405 may delete the registered event.

On the other hand, in step S497, the eUICC manager 404 may notify the terminal 1 that the terminal change processing is completed, and the terminal may display that the service is no longer provided to the installed profile like the screen 317 of FIG. 3A.

On the other hand, in step S498, the MNO BSS 402 may update server information such as HLR so that a service is no more provided to the profile corresponding to the ICCID1 (deactivate profile).

Figure 5:
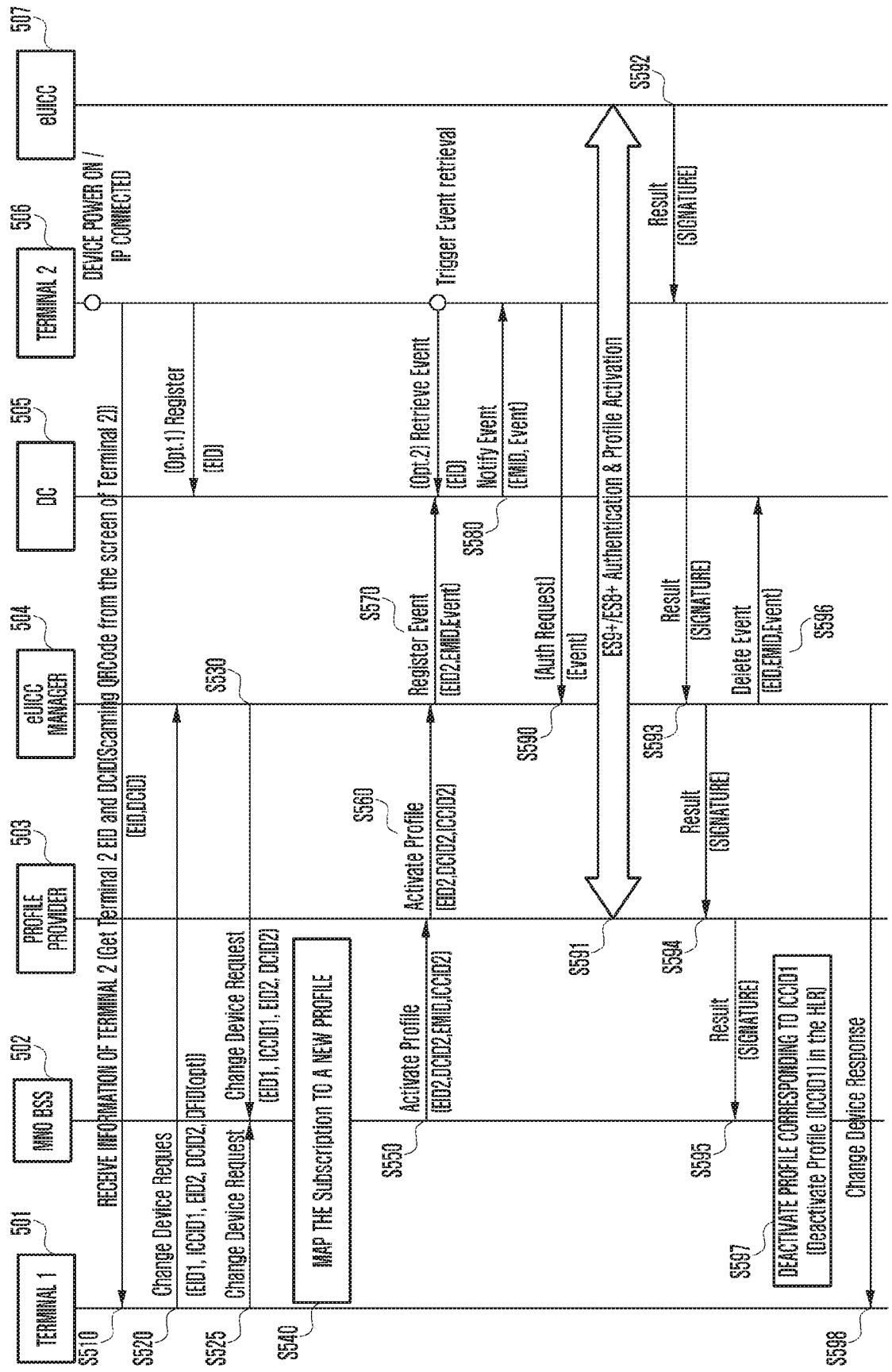
FIG. 5 is a diagram illustrating an operation of a wireless communication system in a terminal change scenario according to another embodiment of the present disclosure.

FIG. 5 is a diagram illustrating an operation of a wireless communication system in a terminal change scenario according to another embodiment of the present disclosure.

Differently from FIG. 4, referring to FIG. 5, after a terminal change scenario is performed between a terminal 1 501 and a terminal 2 506, the case in which a change in a terminal from a terminal 2 506 to a terminal 1 501 is performed or the opposite case will be described.

In FIG. 4, if the mobile communication service is used by changing the terminal from the terminal 1 401 to the terminal 2 406, a procedure of downloading a new profile is included in the terminal 2 406. On the other hand, in the case of FIG. 5, if the terminal change between the terminals is performed more than once, the profile is already stored in the terminal and thus the procedure may be simplified when the terminal is changed to use the mobile communication service. In FIG. 5, the method for using a mobile communication service by changing a terminal when the terminal change is performed more than once will be described.

In step S510, the terminal 1 501 may acquire the information of the terminal 2 506 including the EID and the DCID. The method of acquiring the information of the terminal 2 506 is the same as that described in FIG. 4, which will be omitted in the following description.

The terminal 1 501 acquiring the information of the terminal 2 506 may transmit the terminal change request message (change device request message) to the eUICC manager 504 in step S520. The terminal change request message (change device request message) may include one or more value of the EID1, the ICCID1, the EID2, the DCID2, and the DPID.

The EID1 is the identifier (EID) of the eUICC connected to the terminal 1, the ICCID1 is the identifier (ICCID) of the profile installed in the terminal 1, the EID2 is the identifier (EID) of the eUICC obtained from the terminal 2, and the DCID2 is the identifier (DCID) of the DC obtained from the terminal 2. It may further include the identifier (DPID) of the profile provider capable of processing the ICCID1.

In step S430, the eUICC manager 504 may transmit the terminal change request message (change device request message) by including a part or all of the terminal change request message in the MNO BSS.

However, the terminal 1 may directly transmit the terminal change request message to the MNO BSS 502 as in step S525.

In step S540, the MNO BSS 502 receiving the terminal change request message may confirm whether the EID2 is mapped to an account linked with the ICCID1.

If the EID2 is not mapped to the account connected to ICCID1, the system downloads the profile to the eUICC of the terminal 2 by the process illustrated in FIG. 4

On the other hand, if the EID2 is mapped to the subscription corresponding to the ICCID1, the ICCID2 is mapped to the corresponding EID2, and the ICCID2 is in an deactivate state, the MNO BSS 502 may simplify the terminal change procedure by activating the profile corresponding to the existing ICCID2 instead of downloading a new profile to the eUICC corresponding to the existing ICCID2.

Accordingly, if it is determined that the EID2 is mapped to the subscription corresponding to the ICCID1, the MNO BSS 502 can transmit a profile activation message (ActivateProfile) to the profile provider in step S550.

The profile activation message may include the EID2, the DCID2, the EMID, and the ICCID2.

In step S560, the profile provider 503 having received the message may transmit the profile activation message to the eUICC manager 504 which corresponds to the EMID or is set in advance.

In step S570, the eUICC manager 504 may confirm the DCID2 included in the profile activation message and transmit the event registration message to the DC corresponding to the DCID2.

The event registration message may include the EID, the EMID, and the event information. The event information may include an event type indicating the profile activation message. In step S580, the DC 505 having received the event registration message may transmit the event notification message (Notify Event) including the EMID and the event information. In step S590, the terminal 2 having received the event notification message may transmit an authentication request message (Auth Request) including the event to the eUICC manager 504.

In step S691, the eUICC manager may perform the authentication between the eUICC manager 504 and the eUICC 507 by confirming the event identifier and the event type of the event information included in the authentication request message (Auth Request) and then transmit the profile activation message (ActivateProfile message) to the eUICC through the terminal 2.

The eUICC having received the profile activation message (ActivateProfile message) may activate the deactivate profile and the terminal may use the deactivated profile.

Hereinafter, in step 592, the eUICC may transmit a result message (result) including the signature of the eUICC to the terminal 2 and in step S593, the terminal 2 may transmit the result message to the eUICC manager. In addition, in steps S594 and S595, the eUICC manager may transmit the result message (result) to the MNO-BSS through the profile provider or directly transmit the result message to the MNO-BSS.

Meanwhile, if the event has been processed, in step S596, the eUICC manager 504 may transmit the event delete message (delete event) to the DC and the DC may delete the registered event.

On the other hand, in step S597, the eUICC manager 504 may notify the terminal 1 that the terminal change processing (change device response) is completed, and the terminal may display that the service is no longer provided to the installed profile like the screen 317 of FIG. 3A.

On the other hand, in step S598, the MNO BSS 502 may update server information such as HLR so that a service is no more provided to the profile corresponding to the ICCID1 (deactivate profile).

If the service is provided by activating the profile as described above, the time required for the terminal to download the profile is reduced, so that the user can efficiently use the terminal change.

Figure 6:
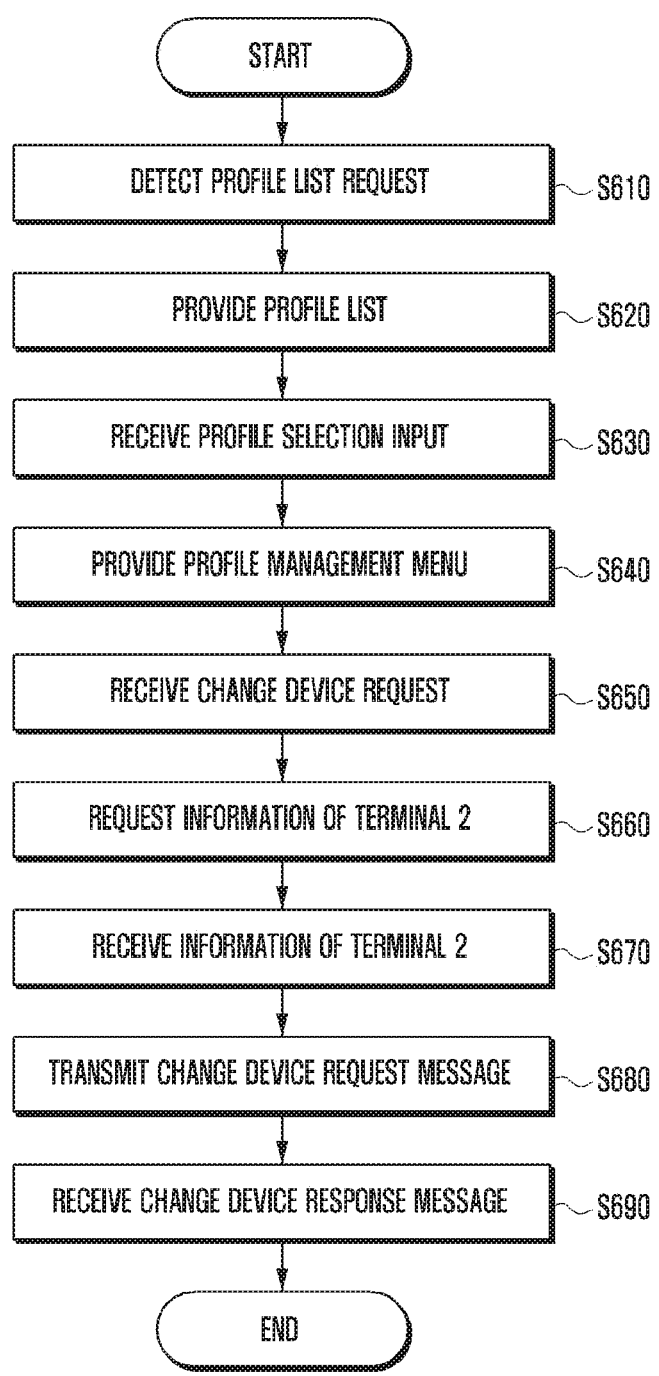
FIG. 6 is a flowchart illustrating a process of changing a terminal of the conventional terminal when the mobile communication service is used by changing the terminal according to the present disclosure.

FIG. 6 is a flowchart illustrating a process of changing a terminal of the conventional terminal when the mobile communication service is used by changing the terminal according to the present disclosure.

The conventional terminal being used by a user is called the terminal 1, and the terminal to be changed is called the terminal 2. Referring to FIG. 6, in step S610, the terminal 1 receives the profile list request input of the user. The profile list may include a part or all of the ICCID value, the MCC+MNC value, the communication company name, the telephone number, and the profile state of the profile included in the profile list.

In step S620, the terminal 1 having received the profile list request input, the terminal 1 can provide the user with the profile list stored in the terminal 1 through the screen of the terminal.

If the user selects any one of the profiles included in the profile list after providing the profile list, the terminal 1 may receive the profile selection input of the user in step S630.

In step S640, the terminal having received the profile selection input may provide the profile management menu for the selected profile to the user. The profile management menu may include a profile enable, a profile disable, a profile deletion, and a menu for transmitting a profile to other devices.

The terminal 1 that has provided the profile management menu may receive an input for selecting any one of the profile management menus. In step S650, if the terminal 1 receives the terminal change request (in the case of receiving the selection of the menu for transmitting a profile to other devices), the terminal 1 requests the information on the terminal 2 in step S660 and receive the information on the terminal 2 in step S670.

The information of the terminal 2 may include the eUICC identifier (EID) of the terminal 2 and the DC identifier (DCID) of the terminal 2. The method of receiving the information on the terminal 2 is the same as that described in FIG. 4, which will be omitted in the following description.

The terminal 1 having received the information of the terminal 2 may transmit the terminal change request message to the eUICC manager in step S680. The terminal change request message may include the EID1 and the ICCID1 which are the information of the terminal 1 and one or more value of the EID2, the DCID2, and the DPID which are information of the terminal 2 received. The terminal change request message is transmitted to the MNO BSS through the eUICC manager.

Alternatively, the terminal 1 may directly transmit the terminal change request message to the MNO BSS in step S680.

If the terminal change is completed, the terminal may receive a terminal change response message in step S690.

Figure 7:
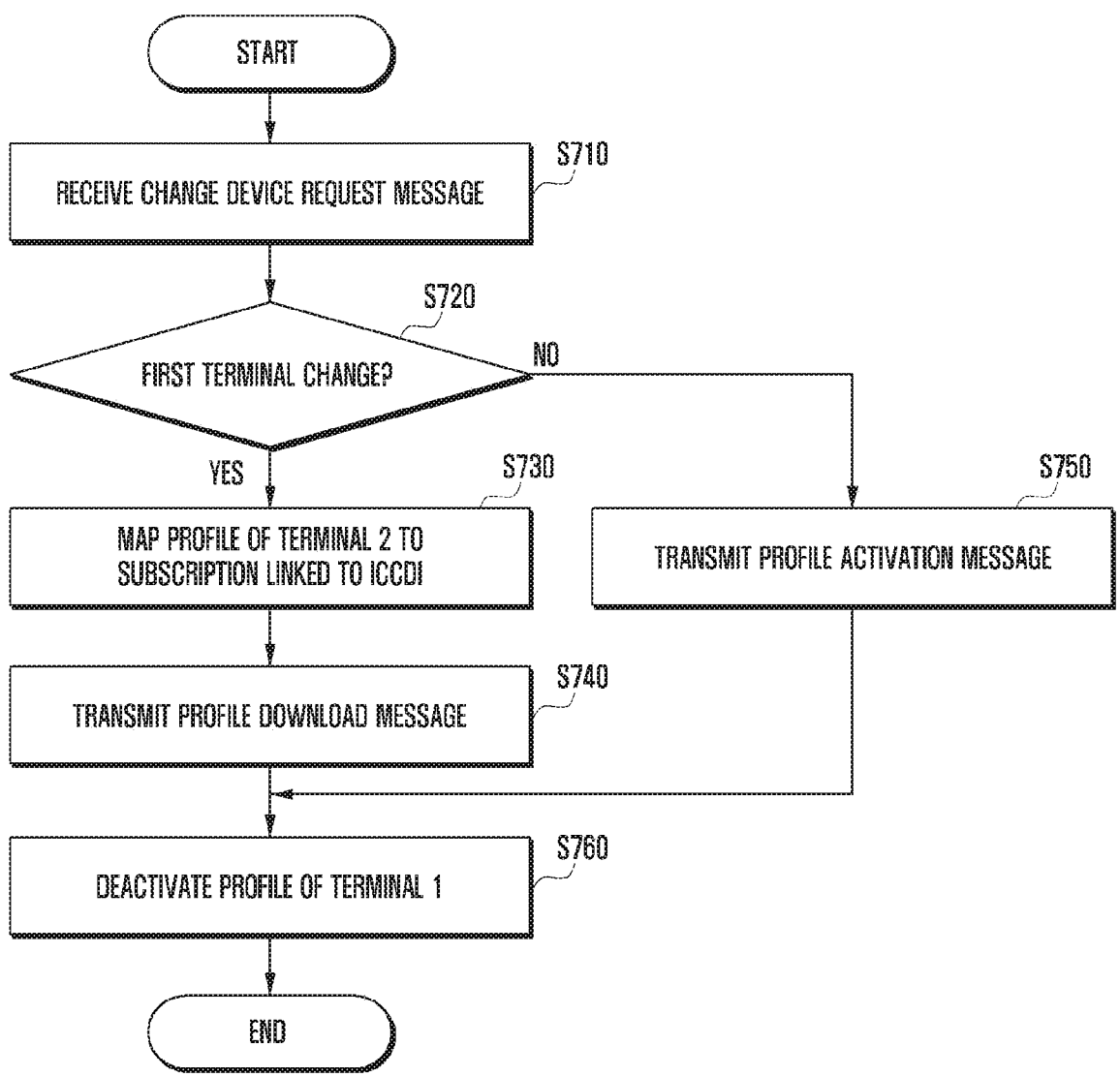
FIG. 7 is a flowchart illustrating an operation sequence of MNO BSS for changing a terminal according to the present disclosure.

FIG. 7 is a flowchart illustrating an operation sequence of MNO BSS for changing a terminal according to the present disclosure.

Referring to FIG. 7, the MNO BSS receives the terminal change request message from the eUICC manager in step S710. Alternatively, the MNO BSS may receive the terminal change request message from the existing terminal (terminal 1).

The MNO BSO having received the terminal change request message determines whether the change in the terminal from the terminal 1 to the terminal 2 is a first terminal change in step 720. To determine whether the terminal change is the first terminal change, the MNO BSS confirms whether the EID2 included in the terminal change request message is mapped to the subscription linked to the ICCID1. That is, when the EID2 is not mapped to the subscription, it means that the terminal is changed to the terminal (hereinafter referred to as terminal 2) to be changed and thus the mobile communication service has never been used.

If the EID2 is not mapped to the subscription, the MNO BSS determines that the terminal change process is the first terminal change. If it is determined that the terminal change is the first terminal change, the MNO BSS maps and manages the ICCID2, which is the profile ID information of the terminal 2, to the account in step S730.

In step S740, the MNO BSS transmits the profile download message so that the eUICC of the terminal 2 may download the profile. Hereinafter, the specific procedure for downloading the profile by the eUICC of the terminal is the same as that described in FIG. 4, and a detailed description thereof will be omitted.

Returning to step S720, if the EID2 is mapped to the subscription corresponding to the ICCID1, the ICCID2 is mapped to the corresponding EID2, and if the ICCID2 is in the deactivate state, the MNO BSS determines that the terminal change is not the first terminal change.

If it is determined that the terminal change is not the first terminal change, the terminal change procedure may be simplified by activating the profile corresponding to the existing ICCID2, instead of downloading a new profile to the eUICC of the terminal 2. Accordingly, the MNO BSS transmits the profile activation message for activating the profile to the profile provider in step S750. Hereinafter, the method for activating the profile is the same as that described in FIG. 5, and a detailed description thereof will be omitted.

Figure 8:
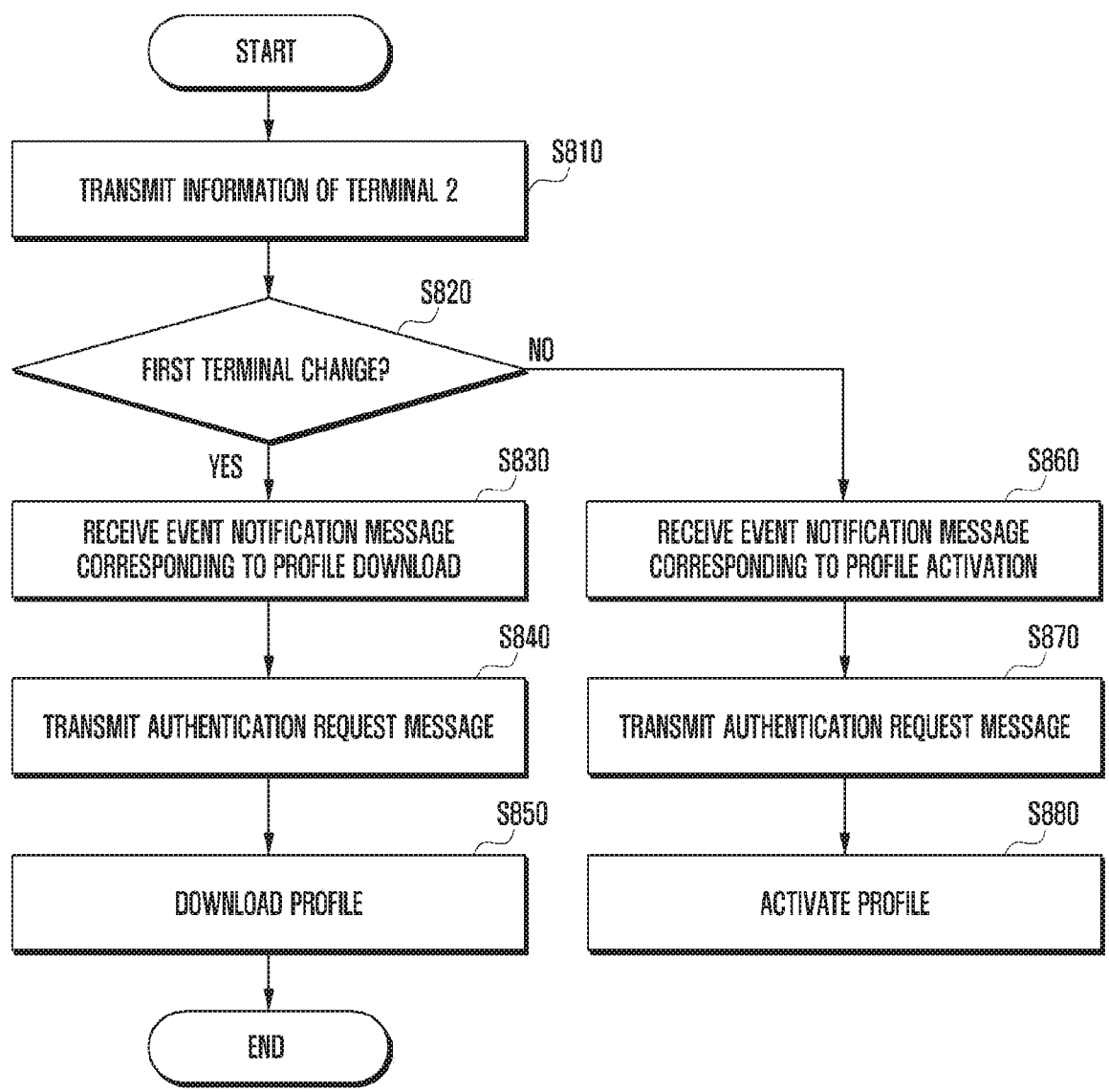
FIG. 8 is a flowchart illustrating a process of downloading, by a terminal to be changed, a profile when the mobile communication service is used by changing the terminal according to the present disclosure.

If a new profile is downloaded to or activated in the terminal 2 by the above process, the MNO BSS deactivates the profile (profile corresponding to ICCID1) for the terminal 1 in step S760. FIG. 8 is a flowchart illustrating a process of downloading, by a terminal to be changed, a profile when the mobile communication service is used by changing the terminal according to the present disclosure.

Hereinafter, the terminal to be changed is referred to as the terminal 2, and the existing terminal that a user is using is referred to as the terminal 1.

Referring to FIG. 8, in step S810, the terminal 2 receives a message requesting the information of the terminal 2 from the existing terminal, and transmits the information of the terminal 2. The information of the terminal 2 may include the EID and the DCID of the terminal 2.

The information of the terminal 2 may be used to determine whether the terminal change is the first terminal change in step S820. For example, if the EID2 of the terminal 2 is mapped to the contract corresponding to the ICCID1 of the terminal 1, the terminal change is not the first terminal change.

On the other hand, if the EID2 of the terminal 2 is not mapped to the subscription linked to the ICCID1, the terminal change is the first terminal change. Accordingly, the profile to be transmitted to the terminal 2 is generated, and the terminal 2 may receive the event notification message including the event information indicating the profile download from the DC in step S830.

The terminal 2 having received the event notification message may transmit the authentication request message to the eUICC manager corresponding to the EMID included in the event notification message in step S840 to download the profile.

Then, in step S850, the terminal 2 may perform the authentication with the profile provider and then download the profile for the terminal 2.

Returning to step S820, if it is determined that the EID2 of the terminal 2 is mapped to the subscription corresponding to the ICCID1 of the terminal 1, the terminal 2 may receive the event notification message including the event information indicating the profile activation from the DC in step S860.

The terminal 2 having received the event notification message may transmit the authentication request message to the eUICC manager corresponding to the EMID included in the event notification message in step S870 to activate the profile.

Then, in step S880, the terminal 2 may perform the authentication with the profile provider and then activate the profile for the terminal 2.

Figure 9:
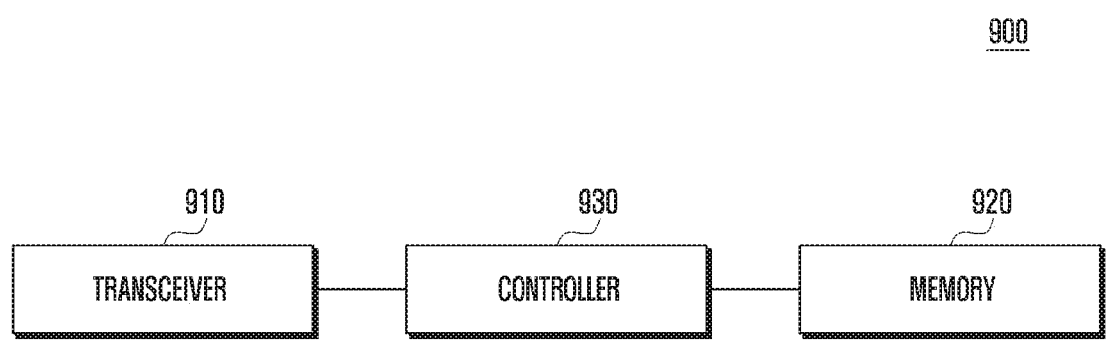
FIG. 9 is a diagram illustrating an internal configuration of a terminal according to the present disclosure.

FIG. 9 is a diagram illustrating an internal configuration of a terminal according to the present disclosure.

Referring to FIG. 9, a terminal 900 may be configured to include a transceiver 910, a memory 920, and a controller 930.

The transceiver 910 transmits/receives a signal to and from another terminal, and may receive information of another terminal or transmit information of the terminal itself to another terminal. Also, the transceiver 910 may transmit/receive a signal with the mobile network operator system.

In addition, the transceiver 910 may transmit/receive a signal to and from the eUICC to install profiles, select profiles, delete profiles, or initialize settings and profiles of the eUICC.

In addition, the transceiver 910 can transmit/receive the information required to start the profile download by transmitting/receiving a signal to and from the DC.

The memory 920 may store the information required for the terminal to download and install the profile and the information required to change the terminal. Specifically, the memory 920 may store the identifier (EID) of the eUICC and the identifier (DCID) of the DC required to install the profile. In addition, the memory 920 may store the identifier (ICCID) of the profile stored in the terminal. In addition, the memory 920 may store the information of the terminal received from another terminal in order to perform the terminal change. Specifically, the memory 920 may store the identifier of the eUICC of another terminal, the identifier of the DC, and the identifier of the profile.

The controller 930 may control an operation required to change the terminal. Specifically, the controller 930 may provide the profile list according to the profile list providing request. In addition, if receiving the terminal change request, the controller 930 may request the terminal information from another terminal, and if receiving the terminal information request from another terminal, the controller 930 may transmit the information of the terminal to another terminal.

If receiving the information of the terminal from another terminal, the controller 930 may transmit the terminal change request message including its terminal information stored in the memory and the terminal information received from another terminal to the eUICC manager. Alternatively, the controller 930 may directly transmit the terminal change request message to the mobile network operator system.

The controller 930 may receive the event notification message including the event information indicating the profile download from the DC. In addition, the controller 930 may transmit the authentication request message to the eUICC manager corresponding to the EMID included in the event notification message to download the profile.

The controller 930 may receive the event notification message including the event information indicating the activation of the profile from the DC and transmit the authentication request message to the eUICC manager corresponding to the EMID included in the event notification message.

In addition, the controller 930 may transmit the EID to the DC through a registration message (Register) after the terminal power on and the IP connected (Device power on/IP connected), and the controller 930 may transmit the event retrieval message (retrieve event) including the EID requesting the event notification to the DC if the event retrieval request is generated (trigger event retrieve).

Figure 10:
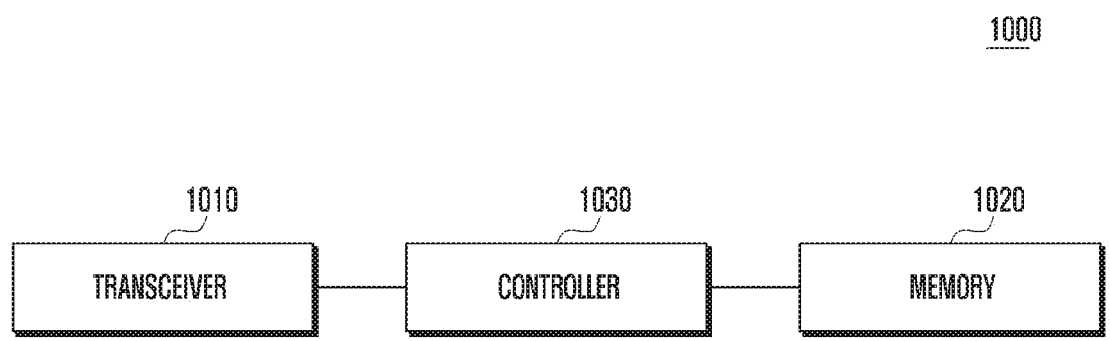
FIG. 10 is a diagram illustrating an internal configuration of a mobile network provider system (MNO system) according to the present disclosure.

FIG. 10 is a diagram illustrating an internal configuration of a mobile network provider system (MNO system) according to the present disclosure.

Referring to FIG. 10, an MNO system 1000 may be configured to include a transceiver 1010, a memory 1020, and a controller 1030.

The transceiver 1010 may transmit/receive a signal to and from another network entity. The transceiver 1010 may transmit/receive signals to/from a terminal and other network entities in a wired or wireless manner.

In addition, the transceiver 1010 may receive information required to download and install the profile to and in the terminal. For example, the transceiver 1020 may receive the identifier (EID) of the eUICC of the terminal, the identifier (DCID) of the DC corresponding to the terminal, and the identifier (ICCID) of the profile stored in the terminal.

The memory 1020 may store the information required to download and install the profile to and in the terminal. For example, the memory 1020 may store the identifier (EID) of the eUICC of the terminal, the identifier (DCID) of the DC corresponding to the terminal, and the identifier (ICCID) of the profile stored in the terminal.

The controller 1030 may control an operation for downloading and installing a profile to and in the terminal. Specifically, the controller 1030 may map and manage the identifier of the profile to be transmitted to the terminal to be changed to the subscription information of the conventional terminal. In addition, the controller 1030 may transmit the profile download message including the identifier of the profile to the profile provider in order to download the profile to the terminal.

Alternatively, if the terminal change is not the first terminal change, the controller 1030 may perform a control to simplify the terminal change procedure by activating the profile corresponding to the existing profile identifier, instead of downloading a new profile to the eUICC for the terminal to be changed.

The methods according to the embodiments described in claims or specification of the present disclosure may be implemented in hardware, software, or a combination of hardware and software.

When the methods are implemented in the software, a computer readable storage medium storing at least one program (software module) may be provided. At least one programs stored in the computer readable storage medium is configured to be executed by at least one processor within an electronic device. At least one program includes instructions that allow the electronic device to execute the methods according to the embodiments described in the claims or specification of the present disclosure.

The program (software module, software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other types of optical storage devices, and a magnetic cassette. Alternatively, the programs may be stored in the memory that is configured of combinations of some or all of the memories. Further, each configuration memory may also be included in plural.

Further, the program may be stored in an attachable storage device that may be accessed through communication networks such as Internet, an intranet, a local area network (LAN), a wide LAN (WLAN), and a storage area network (SAN) or a communication network configured in a combination thereof. The storage device may access a device performing the embodiment of the present disclosure through an external port. Further, a separate storage device on the communication network may also access a device performing the embodiment of the present disclosure.

In the detailed embodiments of the present disclosure, components included in the present disclosure are represented by a singular number or a plural number according to the detailed embodiment as described above. However, the expressions of the singular number or the plural number are selected to meet the situations proposed for convenience of explanation and the present disclosure is not limited to the single component or the plural components and even though the components are represented in plural, the component may be configured in a singular number or even though the components are represented in a singular number, the component may be configured in plural. Although the embodiments described above are separately described herein individually, two or more of the embodiments may be combined and practiced.

In addition, the embodiments of the present disclosure may also be embodied as computer readable codes that may be read by a computer in a computer readable recording medium. The computer readable recording medium may be any data storage device capable of storing data that may be read by a computer system. Examples of the computer readable recording medium include a read-only memory (ROM), a volatile or nonvolatile memory, a CD-ROM, magnetic tapes, floppy disks, optical data storage devices, and carrier waves (like data transmission through the Internet). Also, functional programs, codes, and code segments for accomplishing the present disclosure may be readily interpreted by programmers having ordinary skill in the art to which the present disclosure is applied.

It will be appreciated that the apparatus and method according to embodiments of the present disclosure described above may be implemented in hardware, software, or a combination of hardware and software. Any software may be stored in volatile or non-volatile storage devices such as a ROM, memories such as a RAM, a memory chip, a device, and an integrated circuit, or a storage medium which may be read with a machine (for example, computer) simultaneously with being optically or magnetically recorded such as a CD, a DVD, a magnetic disk, and a magnetic tape, regardless of whether it may be deleted or rewritten. The method according to embodiments of the present disclosure may be implemented by the network entities such as a computer or various portable terminals including a controller and a memory and a server managed by a communication operator in wireless communication systems, and the memory is an example of the storage medium readable by a machine suitable to store a program or programs including instructions implementing the embodiments of the present disclosure.

Accordingly, the embodiments of the present disclosure include a program including codes for implementing the apparatus or method recited in the claims, and a storage medium readable by a machine (such as a computer) for storing the program.

Although the exemplary embodiments of the present disclosure have been disclosed for illustrative purposes, various modifications, additions and substitutions are possible, without departing from the scope and spirit of the disclosure as disclosed in the accompanying claims. Accordingly, the scope of the present disclosure is not construed as being limited to the described embodiments but is defined by the appended claims as well as equivalents thereto.

The invention claimed is:

1. A method of a first terminal in a mobile communication system, the method comprising:
   obtaining, from a second terminal, a second identifier (ID) of a universal integrated circuit card (UICC) of the second terminal, and a second profile ID of the second terminal based on a device change request; and
   transmitting, a device change request message including the second ID, the second profile ID, and a first profile ID of the first terminal,
   wherein the second profile ID is mapped to subscription information corresponding to the first profile ID,
   wherein a second profile corresponding to the second profile ID is determined based on the subscription information corresponding to the first profile ID,
   wherein the second profile is transmitted to the second terminal based on the second ID and the second profile ID after an authentication procedure of the second terminal is completed, and
   wherein a first profile corresponding to the first profile ID is deactivated after the second profile is transmitted to the second terminal.

2. The method of claim 1, wherein the first terminal and the second terminal include the UICC mounted in at least one of an embedded type or a detachable type,
   the device change request message is transmitted to a mobile network operator business support system (MNO BSS) or an embedded UICC (eUICC) manager,
   the device change request message includes a discovery center identifier (DCID) of the second terminal, and
   a data transmission message including the second profile is transmitted to the eUICC manager from a profile provider, and an event registration message including the second profile is transmitted to a discovery center (DC) from the eUICC manager.

3. A method of a mobile network operator business support system (MNO BSS) in a mobile communication system, the method comprising:
   receiving a device change request message including a first profile identifier (ID) of a first terminal, a second ID of a universal integrated circuit card (UICC) of a second terminal, and a second profile ID of the second terminal; and
   transmitting, to the second terminal, a profile download message for transmitting a second profile,
   wherein the second profile ID is mapped to subscription information corresponding to the first profile ID,
   wherein the second profile corresponding to the second profile ID is determined based on the subscription information corresponding to the first profile ID,
   wherein the second profile is transmitted to the second terminal based on the second ID and the second profile ID after an authentication procedure of the second terminal is completed, and
   wherein a first profile corresponding to the first profile ID is deactivated after the second profile is transmitted to the second terminal.

4. The method of claim 3, wherein the first terminal and the second terminal include the UICC mounted in at least one of an embedded type or a detachable type, and
   a data transmission message including the second profile of the second terminal is transmitted to an embedded UICC (eUICC) manager from a profile provider, and an event registration message including the second profile is transmitted to a discovery center (DC) from the eUICC manager.

5. The method of claim 3, wherein the device change request message is received from the first terminal or an eUICC manager, and
the device change request message includes a discovery center identifier (DCID) of the second terminal.

6. A method of a second terminal in a mobile communication system, the method comprising:
transmitting, to a first terminal, a second identifier (ID) of a universal integrated circuit card (UICC) of the second terminal and a second profile ID of the second terminal;
receiving an event notification message including event information indicating a profile download from a discovery center (DC) to download a second profile; and
downloading the second profile based on the event information,
wherein the second profile ID is mapped to subscription information corresponding to a first profile ID,
wherein the second profile corresponding to the second profile ID is determined based on the subscription information corresponding to the first profile ID,
wherein the second profile is downloaded to the second terminal based on the second ID and the second profile ID after an authentication procedure of the second terminal is completed, and
wherein a first profile corresponding to the first profile ID is deactivated after the second profile is downloaded to the second terminal.

7. The method of claim 6, wherein the downloading of the second profile further comprises performing authentication with an embedded UICC (eUICC) manager,
the first terminal and the second terminal include the UICC mounted in at least one of an embedded type or a detachable type, and
a data transmission message including the second profile is transmitted to the eUICC manager from a profile provider, and an event registration message including the second profile is transmitted to the DC from the eUICC manager.

8. A first terminal in a mobile communication system, the method comprising:
a transceiver; and
a controller configured to:
obtain, from a second terminal, a second identifier (ID) of a universal integrated circuit card (UICC) of the second terminal and a second profile ID of the second terminal based on a device request, and
transmit, via the transceiver, a device change request message including the second ID, the second profile ID, and a first profile ID of the first terminal,
wherein the second profile ID is mapped to subscription information corresponding to the first profile ID in case that the second ID is not included in the subscription information,
wherein a second profile corresponding to the second profile ID is determined based on the subscription information corresponding to the first profile ID,
wherein the second profile is transmitted to the second terminal based on the second ID and the second profile ID after an authentication procedure of the second terminal is completed, and
wherein a first profile corresponding to the first profile ID is deactivated after the second profile is transmitted to the second terminal.

9. The first terminal of claim 8, wherein the first terminal and the second terminal include the UICC mounted in at least one of an embedded type or a detachable type, and
a data transmission message including the second profile is transmitted to an embedded UICC (eUICC) manager from a profile provider, and an event registration message including the second profile is transmitted to a discovery center (DC) from the eUICC manager.

10. The first terminal of claim 8, wherein the controller is configured to transmit, via the transceiver, the device change request message to a mobile network operator business support system (MNO BSS) or the eUICC manager, and
the device change request message includes a discovery center identifier (DCID) of the second terminal.

11. A mobile network operator business support system (MNO BSS) in a mobile communication system, the MNO BSS comprising:
a transceiver; and
a controller configured to:
receive, via the transceiver, a device change request message including a first profile identifier (ID) of a first terminal, a second ID of a universal integrated circuit card (UICC) of a second terminal, and a second profile ID of the second terminal, and
transmit, via the transceiver to the second terminal, a profile download message for transmitting a second profile,
wherein the second profile ID is mapped to subscription information corresponding to the first profile ID,
wherein the second profile corresponding to the second profile ID is determined based on the subscription information corresponding to the first profile ID,
wherein the second profile is transmitted to the second terminal based on the second ID and the second profile ID after an authentication procedure of the second terminal is completed, and
wherein a first profile corresponding to the first profile ID is deactivated after the second profile is transmitted to the second terminal.

12. The MNO BSS of claim 11, wherein the first terminal and the second terminal include the UICC mounted in at least one of an embedded type or a detachable type, and
a data transmission message including the second profile of the second terminal is transmitted to an embedded UICC (eUICC) manager from a profile provider, and an event registration message including the second profile is transmitted to a discovery center (DC) from the eUICC manager.

13. The MNO BSS of claim 11, wherein the controller is configured to receive, via the transceiver, the device change request message from the first terminal or an eUICC manager, and
the device change request message includes a discovery center identifier (DCID) of the second terminal.

14. A second terminal in a mobile communication system, the second terminal comprising:
a transceiver; and
a controller configured to:
transmit, via the transceiver to a first terminal, a second identifier (ID) of a universal integrated circuit card (UICC) of the second terminal and a second profile ID of the second terminal,
receive, via the transceiver, an event notification message including event information indicating a profile download from a discovery center (DC) to download a second profile, and download the second profile based on the event information, wherein the second profile ID is mapped to subscription information corresponding to a first profile ID, wherein the second profile corresponding to the second profile ID is determined based on the subscription information corresponding to the first profile ID, wherein the second profile is downloaded to the second terminal based on the second ID and the second profile ID after an authentication procedure of the second terminal is completed, and wherein a first profile corresponding to the first profile ID is deactivated after the second profile is downloaded to the second terminal.

15. The second terminal of claim 14, wherein the controller is configured to perform authentication with an embedded UICC (eUICC) manager, the first terminal and the second terminal include the UICC mounted in at least one of an embedded type or a detachable type, and a data transmission message including the second profile is transmitted to the eUICC manager from a profile provider, and an event registration message including the second profile is transmitted to the DC from the eUICC manager.

* * * * *